US009558380B2

(12) United States Patent
Okoshi et al.

(10) Patent No.: US 9,558,380 B2
(45) Date of Patent: Jan. 31, 2017

(54) CARD CONNECTOR

(71) Applicant: Tyco Electronics Japan G.K., Kanagawa-ken (JP)

(72) Inventors: Yutaka Okoshi, Kanagawa-ken (JP); Katsuhiko Kobayashi, Kanagawa-ken (JP)

(73) Assignee: Tyco Electronics Japan G.K., Kanagawa-ken (JP)

( * ) Notice: Subject to any disclaimer, the term of this patent is extended or adjusted under 35 U.S.C. 154(b) by 0 days.

(21) Appl. No.: 14/459,701

(22) Filed: Aug. 14, 2014

(65) Prior Publication Data
US 2015/0050841 A1 Feb. 19, 2015

(30) Foreign Application Priority Data
Aug. 14, 2013 (JP) .................................. 2013-004720

(51) Int. Cl.
*H01R 24/00* (2011.01)
*G06K 7/00* (2006.01)

(52) U.S. Cl.
CPC .................................. *G06K 7/0021* (2013.01)

(58) Field of Classification Search
CPC . H01R 23/025; H01R 13/6335; H01R 13/633; H01R 13/629; H05K 5/0269
USPC ........................ 439/483, 928.1, 153; 361/737
See application file for complete search history.

(56) References Cited

U.S. PATENT DOCUMENTS

| 8,393,909 | B1 * | 3/2013 | Lai ...................... G06K 13/0831 439/159 |
| 8,634,208 | B2 * | 1/2014 | Duan et al. .................... 361/807 |
| 8,730,680 | B2 * | 5/2014 | Tang .............................. 361/737 |
| 8,976,521 | B2 * | 3/2015 | Liu et al. .................. 361/679.38 |
| 2004/0087194 | A1 * | 5/2004 | Wang .................. H01R 13/6335 439/159 |
| 2006/0079133 | A1 * | 4/2006 | Kim ..................... G06K 7/0021 439/630 |
| 2006/0240713 | A1 * | 10/2006 | Kikuchi ............... G06K 7/0021 439/630 |
| 2007/0108295 | A1 * | 5/2007 | Liu ........................ H05K 5/026 235/492 |
| 2010/0220453 | A1 * | 9/2010 | Chao .................... H05K 5/0269 361/752 |
| 2011/0255252 | A1 * | 10/2011 | Sloey ................... H04B 1/3816 361/752 |
| 2013/0044438 | A1 * | 2/2013 | Tang ............................. 361/737 |
| 2014/0099805 | A1 * | 4/2014 | Kutchery ............. H04B 1/3816 439/76.1 |

(Continued)

FOREIGN PATENT DOCUMENTS

JP 2013048715 * 3/2013
WO 2006/093294 A1 9/2006

*Primary Examiner* — Abdullah Riyami
*Assistant Examiner* — Thang Nguyen
(74) *Attorney, Agent, or Firm* — Barley Snyder

(57) ABSTRACT

A card connector is provided for receiving a card. The card connector includes a housing assembly and a tray. The housing assembly includes a housing and a plurality of contacts extending upward from the housing, with each of the plurality of contacts having a card connecting pad. The tray includes a frame and a pair of plates extending inward from opposite sides of the frame. Each plate of the pair of plates includes a supporting portion extending inward from the frame and a covering portion extending further inward and away from the supporting portion.

15 Claims, 5 Drawing Sheets

(56) References Cited

U.S. PATENT DOCUMENTS

2014/0273564 A1\* 9/2014 Matsumoto ........ G06K 13/0812
439/153

\* cited by examiner

CARD CONNECTOR

CROSS-REFERENCE TO RELATED APPLICATIONS

This application claims the benefit of the filing date under 35 U.S.C. §119(a)-(d) of Japanese Patent Application no. 2013-004720, filed Aug. 14, 2013.

FIELD OF THE INVENTION

The present invention relates to a card connector and, more particularly, to a card connector having a tray on which a card, such as a memory card, is placed.

BACKGROUND

Card connectors are commonly used to receive a card, such as a memory card. Such known card connectors are roughly classified into either a type in which a card is directly inserted into a housing or a type in which a card is placed on a tray. The tray type card connector is commonly used because using a tray makes it possible to use an outer wall face of the tray as a part of an outer wall face of a device equipped with the card connector.

In recent years, cards, such as memory cards, are increasingly being downsized, and accordingly card connectors have become smaller and/or thinner. Therefore, trays are commonly being made of metal since used of a resin tray has insufficient strength.

When a card is inserted into a card connector having pads formed on the lower face thereof, the pads come into contact with contacts of the card connector creating an electrical connection between the card and the card connector. The minimal area and position of the pads formed on the lower face of the card are specified by a standard. Accordingly, in a card connector into which the memory card is inserted, contacts are so disposed as to come into contact with the pads, as long as the pads are formed to the standard. However, the standard of the card only specifies a minimal area of the pads, and allows the pads to have an area larger than or equal to the minimal area. According to the standard, a region on the lower face of the card (where the pads are not formed) is only a peripheral region that is only 0.2 mm wide from the edge. On the other hand, a tray has a large opening in the center thereof to bring contacts into contact with the pads on the lower face of the memory card, and has a shape in which only a region in the vicinity of the periphery of the lower face of the memory card is placed on the tray.

As mentioned above, a metal tray is used for strength. However, a short circuit may occur if the metal tray comes into contact with the pad and, therefore, according to the above standard, the memory card can be placed on the tray along the very narrow region, which is only 0.2 mm wide or less from the edge of the lower face of the memory card.

Placing the memory card on the tray is performed mostly by a user of the card connector (i.e. in a mobile device). The memory card easily falls through the central opening when the card placing region of the tray has a narrow width and, therefore, it is difficult to exactly place the memory card on the tray.

In this regard, since the opening of the tray is required for a portion of the minimal area specified by the standard, there is a suggestion that a region on which the memory card is placed is made wider, and a nonconductive portion is provided by applying an insulation coating to a region possibly coming into contact with the pads (as disclosed in U.S. Patent Application No. 2011/0255252).

Providing this nonconductive portion on the metal tray makes it possible to easily place the memory card on the tray, and prevents a short circuit between the metal tray and the pad.

However, providing the nonconductive portion on the metal tray as disclosed in the prior art causes an increase in cost, since the step of applying an insulation coating is added.

SUMMARY

The object of the present invention, in view of these circumstances, is to provide a card connector for receiving a card with a cost-efficient metal tray which enables simple placement of the card while also avoiding a short circuit. The card connector includes a housing assembly and a tray. The housing assembly includes a housing and a plurality of contacts extending upward from the housing, with each of the plurality of contacts having a card connecting pad. The tray includes a frame and a pair of plates extending inward from opposite sides of the frame. Each plate of the pair of plates includes a supporting portion extending inward from the frame and a covering portion extending further inward and away from the supporting portion. The covering portion is stepped down from an upper surface of the supporting portion, and the covering portion and supporting portion are integrally formed from the same metal material.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENT(S)

An exemplary embodiment of the invention will now be described with reference to FIGS. 1-6.

Figure 1:
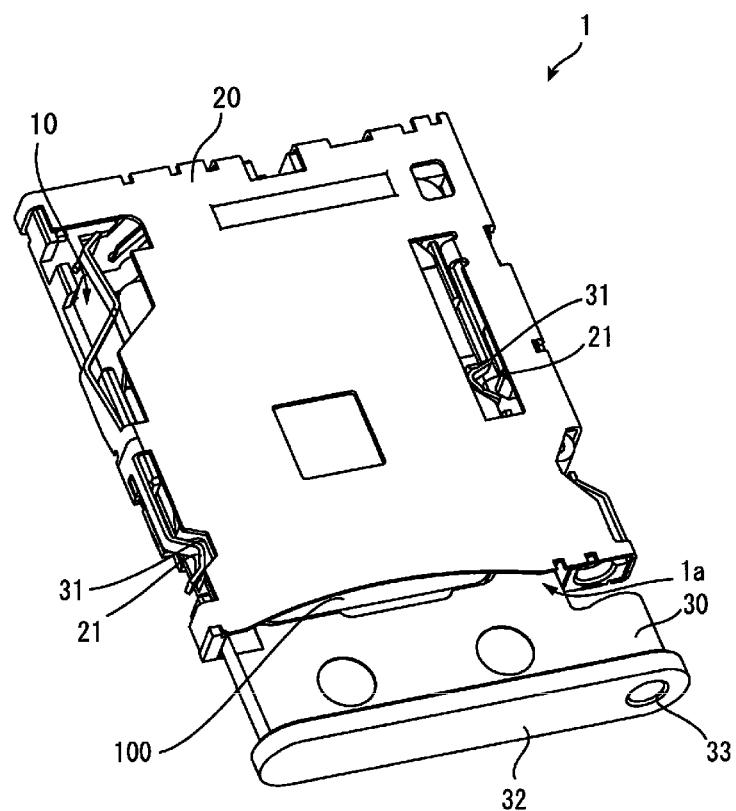
FIG. 1 is a perspective view of a card connector according to the invention.

As shown in FIG. 1, a card connector 1 is provided with a housing assembly 10, a shell 20, and a tray 30. Also a memory card 100 is shown in FIG. 1, which is placed on the tray 30.

A tray receiving passageway 1a is provided between the housing assembly 10 and the shell 20 covering a top section of the housing assembly 10. The tray 30 is inserted into the housing assembly 10 through the tray receiving passageway 1a. An inner space is formed between the housing assembly 10 and the shell 20, and is accessible through the tray receiving passageway 1a When the memory card 100 is placed on the tray 30, the tray 30 is fully insertable into the inner space that wholly receives the tray 30 and memory card 100.

The shell 20 includes cantilever locks 21 that engage notches 31 disposed along right and left side faces of the tray 30. The cantilever locks 21 catch the notches 31 when the tray 30 is inserted. Once the cantilever locks 21 engage the notches 31, the tray 30 is locked as restricts easy ejection of the tray from the inner space. An outer wall 32 of the tray 30 forms a part of a casing of a device equipped with the card connector 1. A distance is provided between the outer wall 32 of the tray and the tray receiving passageway 1a so that a mounting position of the card connector 1 in the device is set back from the casing surface of the device.

Figure 2:
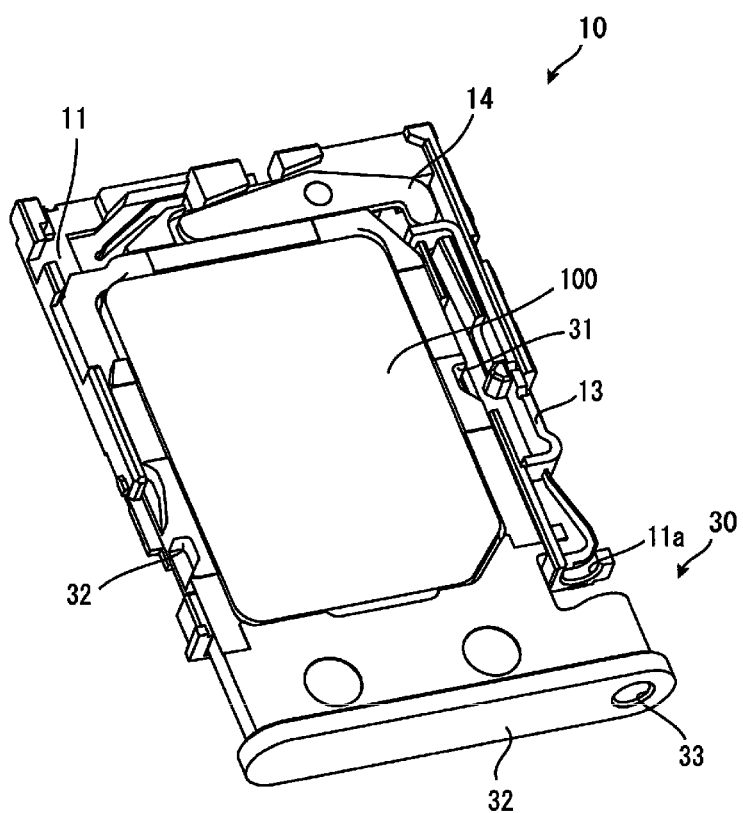
FIG. 2 is a perspective view the card connector shown in FIG. 1, with a shell removed.
Figure 3:
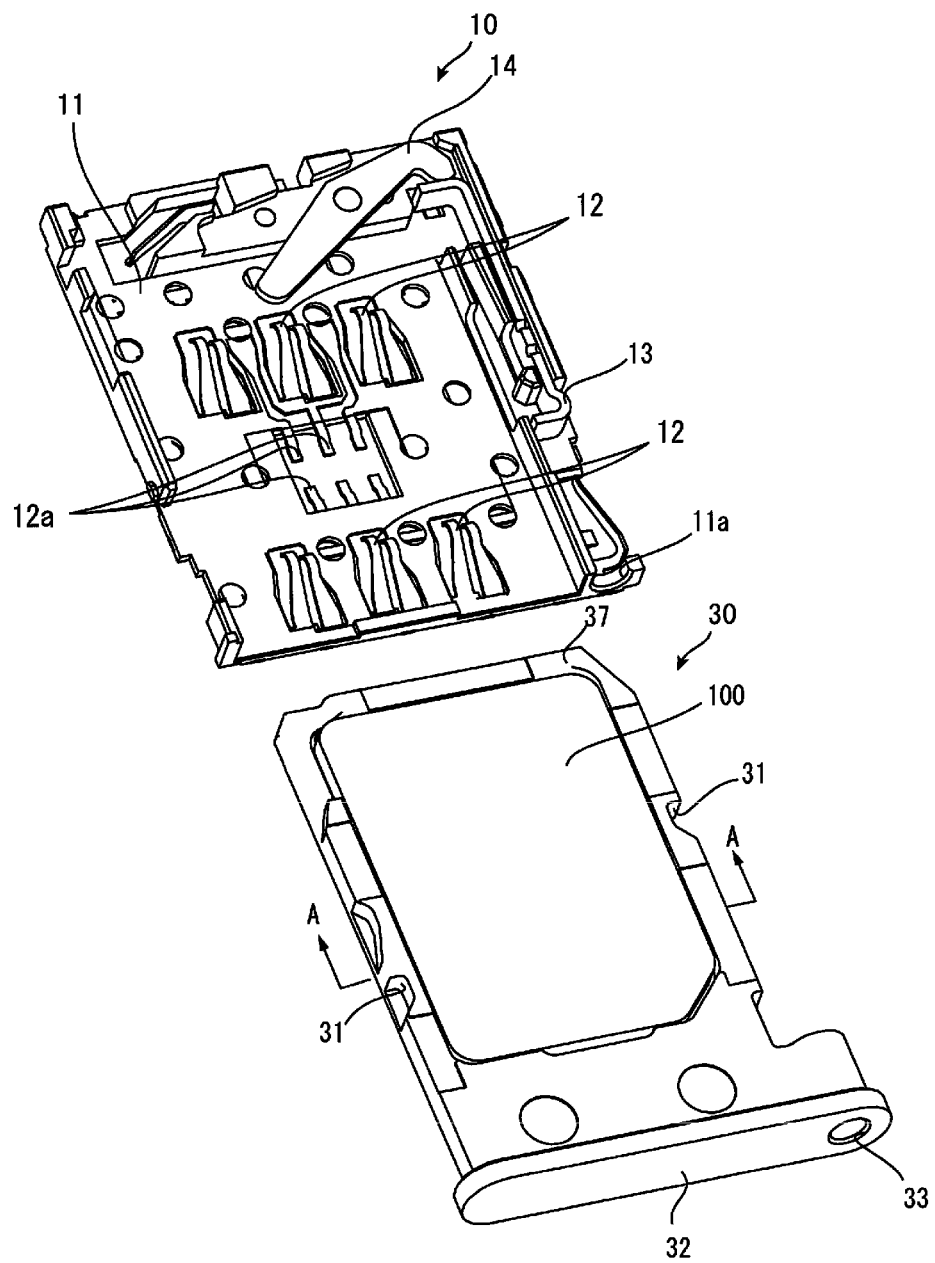
FIG. 3 is an exploded perspective view showing a tray removed from the card connector.

Now with reference to FIGS. 2 and 3, the housing assembly 10 is provided with a resin housing 11, and a plurality of metal contacts 12 (see FIG. 3) formed integrally with the housing 11. Each contact 12 has a board connecting portion 12a to be soldered to a surface of a circuit board (not shown). Pads (not shown) for electrical connection are formed on a lower face of the memory card 100. These contacts 12 serve to contact the pads on the lower face of the memory card 100 when placed on the tray 30 and to electrically interconnect the memory card 100 and the circuit board.

In addition, the housing assembly 10 is provided with a slider 13 and a lever 14. The slider 13 is slidable along the housing 11 between a position where the slider 13 is pushed by an external pin (not shown) and a position when the slider 13 slides to the set-back position shown in FIG. 3.

A pin receiving passageway 33 is formed through the tray 30. The pin receiving passageway 33 is sized to receive a pin. Furthermore, the housing 11 includes an opening 11a that corresponds with the pin receiving passageway 33 and is also sized to receive the pin.

Further, the lever 14 has a central portion pivotally mounted on the housing 11, and has one end disposed in a position of interaction with the slider and the other end disposed in a position of interaction with the tray 30 inserted. Therefore, when the tray 30 is inserted, the lever 14 is pushed by the tray 30 and turns clockwise to slide the slider 13 to the position shown in FIG. 2. When the slider 13 is pushed by inserting the pin through the pin receiving passageway 33 of the tray 30, then the lever 14 is pushed by the slider 13 and turns counterclockwise, and pushes the tray 30 out. The outer wall 32 of the tray 30 having been pushed out to a pushed-out position projects from the device equipped with the card connector. Thereafter, a user hooks his/her finger or nail on the tray 30 and draws the tray 30 out.

Figure 4:
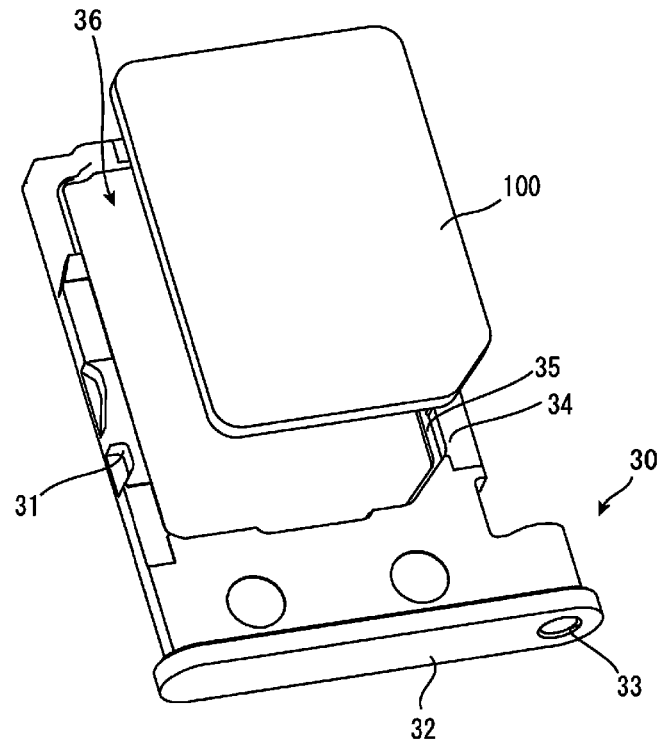
FIG. 4 is a perspective view showing a memory card lifted from the tray.

As shown in FIG. 4, a portion of the tray 30 includes a frame 34 and a plate 35 on which the memory card 100 is placed. The frame 34 corresponds to side faces of the memory card 100, and surrounds the side faces of the memory card 100. This frame 34 guides the memory card 100 on the tray 30. Further, the frame 34 restricts unintentional lateral movement of the memory card 100.

In addition, the plate 35 extends inward from the frame 34 and faces the lower face of the memory card 100. The plate 35 has a narrow width. Further, the tray 30 includes an opening 36. The opening 36 exposes a wide central region in the lower face of the memory card 100 and brings the contacts 12 (see FIG. 3) into contact with the pads on the lower face of the memory card 100.

Figure 5:
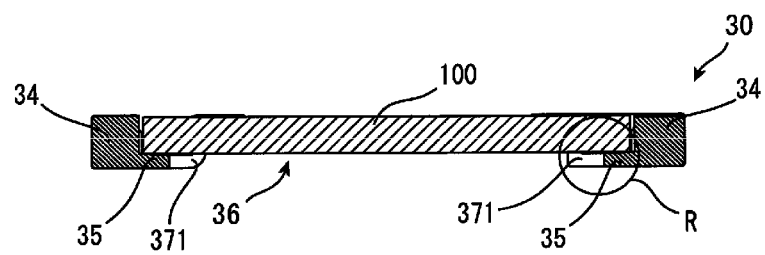
FIG. 5 is a sectional view of the tray, taken along line A-A in FIG. 3.

As shown in FIG. 5, the frame 34 and the plate 35 extend inward from the frame 34. A rib 371 constituting a beam 37 (see FIG. 3) is disposed on deep side of the tray 30.

Figure 6:
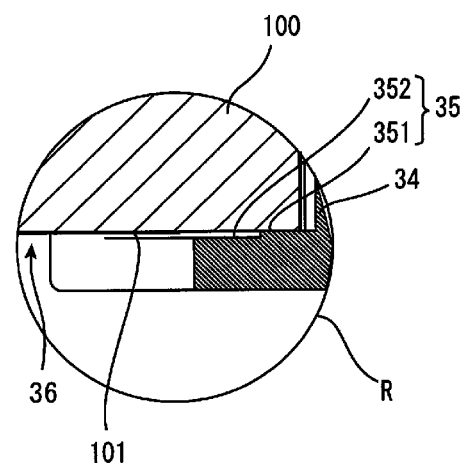
FIG. 6 is an enlarged view of a portion indicated by a circle R in FIG. 5.

As shown in FIG. 6, the plate 35 includes a supporting portion 351 and a covering portion 352. The supporting portion 351 is a portion extending inward from the frame 34, and comes into contact with a peripheral edge region of the lower face of the memory card 100 and supports the peripheral edge region. On the other hand, the covering portion 352 is a portion spaced from the lower face of the memory card 100 and extends further inward from the supporting portion 351 for covering a peripheral edge bordering region adjacent to the peripheral edge region of the lower face of the memory card 100. Further, the opening 36 extends through the plate 35 for exposing the central region inside the peripheral edge bordering region of the lower face of the memory card 100. The opening allows the contacts 12 (see FIG. 3) to make contact with the pads 101 on the lower face of the memory card 100. In the example shown, the covering portion 352 is formed one step lower than the supporting portion 351 so as to avoid coming into contact with the pads of the memory card 100.

As shown in FIG. 6, an area of each pad 101 is minimized. The pad 101 may extend to a position where the pad 101 overlaps with the covering portion 352, but never extends to the supporting portion 351. Since the covering portion 352 is formed one step lower than the supporting portion 351, the pad 101 never comes into contact with the covering portion 352 even if overlapping with the covering portion 352 and, therefore, a short circuit should not occur. The supporting portion 351 supports the memory card 100. Therefore, the covering portion 352 has nothing to do after the memory card 100 is correctly placed. However, the covering portion 352 is provided to prevent the memory card 100 from falling through the opening 36 when the memory card 100 is placed on the tray 30, thereby assisting with the placement of the card 100.

It should be noted that in the above embodiment, the covering portion 352 is formed one step lower than the supporting portion 351, but the covering portion may extend obliquely downward from the supporting portion toward the opening.

Herein, an example of a card connector adopting a tray has been described, but the card connector of the present invention is not limited to this example, and is applicable to a wide variety of card connectors of a type in which a card is placed on a tray and the tray having the card thereon is inserted.

Although exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A card connector comprising:
    a housing assembly having a housing and a plurality of contacts extending upward from the housing and each of the plurality of contacts having a card connecting pad; and
    a tray having a frame and a pair of plates extending inward from opposite sides of the frame, each plate of the pair of plates having a supporting portion extending inward from the frame and a covering portion extending further inward and away from the supporting portion; wherein
    the covering portion is stepped down from an upper surface of the supporting portion, and the covering portion and supporting portion are integrally formed from the same metal material.

2. The card connector of claim 1, wherein the plurality of metal contacts are integrally formed with the housing.

3. The card connector of claim 1, wherein the housing is formed of a resin.

4. The card connector of claim 1, wherein the housing assembly includes a slider extending along the housing and pushable by an external pin.

5. The card connector of claim 4, wherein the housing assembly further includes a lever pivotally mounted at a rear of the housing engageable with the slider.

6. The card connector of claim 1, further comprising a shell covering a top surface of the housing assembly.

7. The card connector of claim 6, further comprising a tray receiving passageway disposed between the housing assembly and the shell.

8. The card connector of claim 7, further comprising a card receiving inner space formed between the housing assembly, the shell, and the tray receiving passageway.

9. The card connector of claim 8, wherein shell includes a cantilever lock extending into the card receiving inner space.

10. The card connector of claim 9, wherein the tray includes a notch disposed along right and left side faces thereof to engage with the cantilever lock.

11. The card connector of claim 10, wherein the cantilever lock catches the notch when the tray is fully inserted into the card receiving inner space.

12. The card connector of claim 11, wherein the tray is secured with the card receiving inner space when the cantilever lock engages the notch.

13. The card connector of claim 1, wherein the tray includes an opening positioned between the pair of plates.

14. The card connector of claim 13, wherein the card connecting pad extends through the opening.

15. The card connector of claim 1, wherein the supporting portion abuts a card inserted into the card connector.

* * * * *